(12) United States Patent
Kothari

(10) Patent No.: US 10,683,430 B2
(45) Date of Patent: Jun. 16, 2020

(54) COATING COMPOSITION FOR POLYESTER FILM

(71) Applicant: POLYPLEX CORPORATION LTD., Uttar Pradesh (IN)

(72) Inventor: Pranay Kothari, Uttar Pradesh (IN)

(73) Assignee: POLYPLEX CORPORATION LTD., Uttar Pradesh (IN)

( * ) Notice: Subject to any disclaimer, the term of this patent is extended or adjusted under 35 U.S.C. 154(b) by 190 days.

(21) Appl. No.: 14/908,797

(22) PCT Filed: Jul. 31, 2014

(86) PCT No.: PCT/IB2014/063575
§ 371 (c)(1),
(2) Date: Jan. 29, 2016

(87) PCT Pub. No.: WO2015/015449
PCT Pub. Date: Feb. 5, 2015

(65) Prior Publication Data
US 2016/0160070 A1  Jun. 9, 2016

(30) Foreign Application Priority Data

Jul. 31, 2013  (IN) .......................... 2288/DEL/2013

(51) Int. Cl.
*C09D 123/08* (2006.01)
*C08L 23/08* (2006.01)
*C08J 7/04* (2020.01)
*B32B 27/08* (2006.01)
*B32B 3/10* (2006.01)
(Continued)

(52) U.S. Cl.
CPC ...... *C09D 123/0869* (2013.01); *C08J 7/0427* (2020.01); *C08L 23/0869* (2013.01); *B05D 7/04* (2013.01); *B05D 2201/02* (2013.01); *B05D 2201/04* (2013.01); *B05D 2401/20* (2013.01); *B05D 2502/00* (2013.01); *B05D 2520/00* (2013.01); *B32B 3/10* (2013.01); *B32B 27/08* (2013.01); *B32B 27/36* (2013.01); *B32B 2255/10* (2013.01); *B32B 2255/205* (2013.01); *B32B 2255/28* (2013.01); *B32B 2307/21* (2013.01); *B32B 2307/402* (2013.01); *B32B 2307/406* (2013.01); *B32B 2307/408* (2013.01); *B32B 2307/41* (2013.01); *B32B 2307/412* (2013.01); *B32B 2307/414* (2013.01); *B32B 2307/514* (2013.01); *B32B 2307/516* (2013.01); *B32B 2307/518* (2013.01); *B32B 2307/75* (2013.01); *B32B 2367/00* (2013.01); *C08J 3/02* (2013.01); *C08J 3/03* (2013.01); *C08J 7/04* (2013.01); *C08J 7/056* (2020.01); *C08J 2323/08* (2013.01); *C08J 2367/00* (2013.01); *C08J 2423/08* (2013.01); *C08J 2429/04* (2013.01); *C08J 2431/04* (2013.01); *C08J 2433/02* (2013.01); *C08J 2433/06* (2013.01); *C08J 2433/08* (2013.01); *C08J 2433/10* (2013.01); *C08J 2433/12* (2013.01); *C08K 3/017* (2018.01); *C08K 5/00* (2013.01); *C08K 5/0075* (2013.01); *C08L 23/08* (2013.01); *C08L 23/0853* (2013.01); *C08L 31/04* (2013.01); *C08L 33/04* (2013.01); *C08L 33/06* (2013.01); *C08L 33/08* (2013.01); *C08L 33/10* (2013.01); *C08L 33/12* (2013.01); *C08L 2201/04* (2013.01); *C08L 2201/54* (2013.01); *C08L 2203/16* (2013.01); *C08L 2205/03* (2013.01); *C08L 2314/00* (2013.01); *C09D 123/08* (2013.01); *C09D 123/0853* (2013.01); *C09D 131/04* (2013.01); *C09D 133/04* (2013.01); *C09D 133/06* (2013.01); *C09D 133/08* (2013.01); *C09D 133/10* (2013.01); *C09D 133/12* (2013.01); *Y10T 428/24802* (2015.01); *Y10T 428/24893* (2015.01); *Y10T 428/24901* (2015.01); *Y10T 428/31681* (2015.04);
(Continued)

(58) Field of Classification Search
None
See application file for complete search history.

(56) References Cited

U.S. PATENT DOCUMENTS 3,912,674 A  10/1975 Stahl
4,165,308 A * 8/1979 Serlin .................. C09D 125/14
428/513

(Continued)

FOREIGN PATENT DOCUMENTS

EP  0 782 932 A1  7/1997
EP  2 179 844 A1  4/2010
(Continued)

OTHER PUBLICATIONS

International Search Report for PCT/IB2014/063575, dated Dec. 19, 2014, 4 pgs.
(Continued)

*Primary Examiner* — Vivian Chen
(74) *Attorney, Agent, or Firm* — Patterson Thuente Pedersen, P.A.

(57) ABSTRACT

The present invention relates to a coating composition for polyester film capable of printing on all types of printers with liquid and dry toners. The coating composition comprising of a combination of polyethylene carboxylic acid dispersion and homopolymer or copolymer of polyacrylate dispersion and/or homopolymer or copolymer of polyvinyl acetate dispersion, wherein acrylate and/or acetate content be is in the range of 1 to 50% of carboxylic acid content in the dispersion.

14 Claims, No Drawings

(51) Int. Cl.
B32B 27/36 (2006.01)
C09D 133/04 (2006.01)
C09D 131/04 (2006.01)
C09D 133/06 (2006.01)
C09D 133/08 (2006.01)
C09D 133/10 (2006.01)
C09D 133/12 (2006.01)
C08L 33/06 (2006.01)
C08L 33/10 (2006.01)
C08L 33/04 (2006.01)
C08L 33/12 (2006.01)
C08L 33/08 (2006.01)
C08L 31/04 (2006.01)
C08K 5/00 (2006.01)
C08K 3/017 (2018.01)
B05D 7/04 (2006.01)
C08J 7/056 (2020.01)
C08J 3/03 (2006.01)
C08J 3/02 (2006.01)

(52) U.S. Cl.
CPC .......... Y10T 428/31786 (2015.04); Y10T 428/31797 (2015.04); Y10T 428/31938 (2015.04)

(56) References Cited

U.S. PATENT DOCUMENTS

| | | | | |
|---|---|---|---|---|
| 4,711,816 A * | 12/1987 | Wittnebel | | G03G 7/0006 346/135.1 |
| 4,912,009 A * | 3/1990 | Amering | | G03G 9/0806 430/108.2 |
| 5,130,189 A * | 7/1992 | Hart | | G03G 7/00 427/108 |
| 5,277,965 A * | 1/1994 | Malhotra | | B41M 5/504 347/105 |
| 5,310,595 A * | 5/1994 | Ali | | B41M 5/5254 428/195.1 |
| 5,330,823 A * | 7/1994 | Malhotra | | G03G 7/0033 428/206 |
| 5,520,993 A * | 5/1996 | Lambert | | G03G 7/0006 428/195.1 |
| 5,663,029 A * | 9/1997 | Malhotra | | G03G 7/0013 428/195.1 |
| 5,728,502 A * | 3/1998 | Ou-Yang | | G03G 7/004 430/117.4 |
| 5,776,604 A * | 7/1998 | Lu | | B41M 1/30 427/412.3 |
| 5,789,123 A * | 8/1998 | Cleckner | | C08J 7/047 428/326 |
| 5,858,516 A * | 1/1999 | Ou-Yang | | G03G 7/002 428/195.1 |
| 6,015,603 A * | 1/2000 | Ou-Yang | | B32B 27/08 427/207.1 |
| 6,296,931 B1 * | 10/2001 | Azizi | | G03G 7/002 428/221 |
| 6,623,902 B1 * | 9/2003 | Ben-Avrahann | | C08L 23/0853 430/114 |
| 7,279,513 B2 | 10/2007 | Zhang et al. | | |
| 8,304,157 B2 | 11/2012 | Kouyama et al. | | |
| 9,296,244 B2 * | 3/2016 | Song | | B41M 5/52 |
| 2002/0058194 A1 * | 5/2002 | Williams | | B41M 5/025 430/138 |
| 2004/0058258 A1 * | 3/2004 | Yoshino | | G03G 9/0827 430/108.1 |
| 2004/0091296 A1 * | 5/2004 | Ishizuka | | G03G 15/2064 399/329 |
| 2004/0244928 A1 * | 12/2004 | Huang | | D21H 17/37 162/135 |
| 2006/0159910 A1 * | 7/2006 | Song | | B41M 5/52 428/323 |
| 2006/0275593 A1 * | 12/2006 | Kern | | B32B 27/08 428/220 |
| 2007/0031615 A1 * | 2/2007 | Nair | | B41M 5/502 428/32.38 |
| 2008/0113126 A1 * | 5/2008 | Anderson | | B41M 5/52 428/32.5 |
| 2009/0047458 A1 * | 2/2009 | Fujinaga | | G03G 7/004 428/41.3 |
| 2010/0080916 A1 * | 4/2010 | Song | | B41M 5/52 427/288 |
| 2011/0151167 A1 * | 6/2011 | Okumura | | B32B 7/06 428/40.6 |
| 2013/0216808 A1 * | 8/2013 | Kozlowski | | G03G 7/0013 428/218 |
| 2013/0288040 A1 * | 10/2013 | Kozlowski | | G03G 7/0013 428/323 |

FOREIGN PATENT DOCUMENTS

| | | |
|---|---|---|
| GB | 1 427 488 A | 3/1976 |
| WO | WO 00/59733 A1 | 10/2000 |
| WO | WO 2014/137516 A1 | 9/2014 |

OTHER PUBLICATIONS

Internation Preliminary Examination Report on Patentability for PCT/IB2014/063575, dated Oct. 20, 2015, 20 pgs.
Pavone, Anthony. A Private Report by the Process Economics Program Report No. 6E. Acrylic Acid from Clycerin; Dec. 2011, Menlo Park, California 94025; SRI Consulting, HIS Inc. 18 pages.
Ethyl Acrylate (CAS Reg. No. 140-88-5) Interim Acute Exposure Guideline Levels (AEGLs) for NAS/COT Subcommittee for AEGLs; Oak Ridge National Laboratory, managed by UT-Battelle, LLC., for the U.S. Dept. of Energy under contract DE-AC05-00OR22725; Interim 1: Aug. 2007; 47 pages.
Essential Ingredients, Inc | Product Search Results; description You are browsing for Polymers http://www.essentialingredients.com/productdetail.aspx?Srch=0&CatID=22&FunID?0 [retrieved Jul. 19, 2018; coyright dated 2012-2018] 4 pages.
*Int. J. Electrochem. Sci.*, 7 (2012) 2019-2027; International Journal of Electrochemical Science www.electrochemsci.org *Short Communications* Preparation and Characterization of Poly Vinyl Acetate Nanofiber Doping Copper Metal; Accepted: Feb. 3, 2012 / Published: Mar. 1, 2012; 9 pages.
Celanese Acetyl Intermediates; Product Description and Handling Guide Vinyl Acetate; Vinyl Acetate; PDHG—VAM—Nov. 2011; 8 pages.
Boone, et al.; JACS Communications; Published on Web Jun. 29, 2002 "Copolymerization Studies of Vinyl Chloride and Vinyl Acetate with Ethylene Using a Transition-Metal Catalyst" *The Dow Chemical Company, Corporate R&D*, 2301 North Brazosport BouleVard, B-3814 Freeport, Texas 77541-3257, and *California Institute of Technology, Materials and Process Simulation Center* (139-74), Pasadena, California 91125; 2 pages.

* cited by examiner

COATING COMPOSITION FOR POLYESTER FILM

RELATED APPLICATIONS

This application is a National Phase entry of PCT Application No. PCT/IB2014/063575, filed Jul. 31, 2014, which claims priority from Indian Application No. 2288/DEL2013, filed Jul. 31, 2013, the disclosures of which are hereby incorporated by referenced herein in their entirety.

FIELD OF THE INVENTION

The present invention relates to a coating composition for polyester film capable of printing, on all types of electrostatic printers with liquid and dry toners. The coating composition is a combination of polyethylene carboxylic acid dispersion and homopolymer or copolymer of polyarylate dispersion or homopolymer or copolymer of polyvinyl acetate dispersion.

BACKGROUND AND PRIOR ART OF THE INVENTION

Digital printing is an effective method of image transfer which is currently getting popular as it automates and streamlines the printed image without much operator intervention. Image is formed on the imaging surface by use of a uniform electrostatic charge distribution throughout the surface. The electrostatic charge can be created by the corona and the print image is developed by applying toner which adhere to the surface and develop the image. Common digital printing presses available in market are from HP indigo, Kodak, Xerox, Canon, Ricoh Konica etc.

Digital printers usually use either liquid or dry toners for printing. Liquid ink is used by HP indigo. HP indigo follows offset process where ink is transferred from photo imaging cylinder to offset cylinder and then to the substrate. Dry toner based ink is used by Konica Minolta and Xerox Digital. Konika Minolta talks about using low temperature fusion Simitri HC toners to give a offset finish where fixing temperature requires to be as low as 150° C. as mentioned in their U.S. Pat. No. 8,304,157 and Xerox uses low melt EA (Emulsion Aggregrates) dry ink technology which also fuses with substrate at low temperature.

It is well known that electrostatic properties depend upon the nature of the substrate. For any machine working by electrostatic function, electrostatic properties are of atmost importance. It is well known fact if any substrate comes in contact with any other substrate or material coefficient of friction, static properties etc art important to determine the easy movability of the substrate. These properties can be easily determined by simple testing instruments.

Substrates to be printed are fed into the printing press in either sheet form or in roll form. In sheet form, the sheets are put in a tray and sheets either slide or are picked one by one or any other method known in the art and sent to the printing section for printing. For easy sliding and picking, minimization of static charge is of foremost importance. If the substrate has high static, it will not slide easily or be picked up easily or multiple sheet will be picked or slide together. In roll form, the substrate from the unwinder moves to printer and after printing rolls move to the winder roll. The substrate is later further processed as per requirement.

The U.S. Pat. No. 7,279,513 describes coatings for paper consisting of Ethylene Acrylic Acid (EAA) for digital printing. This patent specifically discloses EAA coating over paper only and fails to disclose combination of EAA and vinyl acetates or acrylates coatings be applied over the oriented polyester film. A drawback of using EAA coating over film is of static charge. EAA has high static charge hence, cannot be used in all types of digital printing processes due to poor runability. EAA Coated films are coated by off-line method and EAA coating has been mentioned only for HP Indigo printers which use liquid toners.

It is an object of the present invention to overcome the difficulties presently encountered in the art of providing the coated oriented polyester film which is capable of receiving both liquid as well as dry toners on all types of the printers.

The inventive film exhibits properties that are significantly different from those of another coated polyester film where the film is coated by acrylic, copolyester or polyurethanes. The other coated polyester films are printed by using engraved cylinders. The inventive film is used for electrostatic printing. In the electrostatic printing process, the printing is done by means of electrostatic charge. The present invention relates to an oriented polyester film, having electrostatic printing characteristics and is capable of printing on all types of electrostatic printers with liquid and dry toners such as Xerox iGen digital printing press, digital indigo HP ink systems, Ricoh Digital Press, Canon digital press, Kodak Digital press etc.

OBJECTIVES OF THE INVENTION

The primary objective of the present invention is to provide a coating composition for polyester film to print on electrostatic printers.

Another objective of the present invention is to provide a coated polyester film that is capable of printing on all types of electrostatic printers with liquid and dry toners.

Yet another objective of the present invention is to provide a coated polyester film where the coating is done either inline i.e. during process of film formation or offline i.e. after film formation.

Yet another objective of the present invention is to provide a coated polyester film for reducing static charge on the said film, so as to pick an individual film one by one by the printer while printing and is capable of printing on all types of printers.

Yet another objective of the present invention is to provide a method for preparation of coated polyester film where the said coated polyester film is used as a substrate for all commercially available digital printing machines.

SUMMARY OF THE INVENTION

The present invention relates to a coating composition for applying on polyester film capable of printing on all types of electrostatic printers comprising a combination of polyethylene carboxylic acid dispersion and homopolymer or copolymer of polyacrylate dispersion and/or homopolymer or copolymer of polyvinyl acetate dispersion, wherein acrylate and/or acetate content is in the range of 1 to 50% of carboxylic acid content in the dispersion mixture. The present invention also relates to an oriented polyester film coated by above said coating composition that is capable of printing on all types of (electrostatic) printers with liquid and dry toners. The present invention further relates to the process of achieving the coated polyester film. The present invention also relates to coating process where the coating composition is capable of coating by inline as well as offline method. The present invention further relates to printing process, so the printing machine pick an individual film one by one while printing and/or so as to be printed in roll form.

DETAILED DESCRIPTION OF THE INVENTION

While the invention is susceptible to various modifications and alternative forms, specific aspect thereof has been shown by way of example and will be described in detail below. It should be understood, however that it is not intended to limit the invention to the particular forms disclosed, but on the contrary, the invention is to cover all modifications, equivalents, and alternative falling within the spirit and the scope of the invention.

The Applicants would like to mention that the examples are mentioned to show only those Specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process that comprises a list of components does not include only those components but may include other components not expressly listed or inherent to such process. In other words, one or more elements in a system or process proceeded by "comprises . . . a" does not, without more constraints, preclude the existence of other elements or additional elements in the system or process.

Accordingly, the present invention in one aspect relates to coating composition for applying on polyester film for printing on electrostatic printers where electrostatic printer uses liquid or dry toners so as to pick an individual film one by one by the printer while printing or so as to be printed in roll form and is capable of printing on all types of printers.

In another aspect of the invention it relates to a coating composition for applying on polyester film capable of printing on all types of electrostatic printers comprising a combination of polyethylene carboxylic acid dispersion and homopolymer or copolymer of polyacrylate dispersion and/or homopolymer or copolymer of polyvinyl acetate dispersion, wherein acrylate and/or acetate content is in the range of 1 to 50% of carboxylic acid content in the dispersion.

In yet another embodiment of the invention the preferable range of acrylate and/or acetate content is 5 to 30% of carboxylic acid content in the dispersion.

In yet another embodiment of the invention the carboxylic acid in polyethylene carboxylic acid dispersion is selected from but not limited to acrylic acid, methacrylic acid, ethacrylic acid, propyl acrylic acid, butyl acrylic acid, hexyl acrylic acid, octyl acrylic acid and other higher acids having carbon chain length upto C15 or combination thereof.

In another embodiment of the invention the polyvinyl acetate is homopolymer or copolymer of methyl acetate, butyl acetate or higher acetates having carbon chain length upto C15 carbon atom or combination thereof.

In yet another embodiment of the invention the vinyl acetate dispersions are selected from the group such as VEOVA or other copolymers like Vinyl acrylate—Ethylene copolymer, Vinyl acrylate—VEOVA copolymer, Vinyl acetate acrylic copolymer, Vinyl acetate—Vinyl Chloride copolymers, Vinyl acetate—Acrylamide copolymers, Vinyl Acetate—Butyl Acetate copolymers, vinyl acetate dibutyl maleinate copolymer, Vinyl Acetate—2 Ethyl Hexyl Acrylate copolymer In yet another embodiment of the invention the polyacrylate is homopolymer or copolymer of methylacrylate, ethylacrylate, methylmethaerylate, ethylethacrylate, n-butyl acrylate, butyl methacrylate, hexyl acrylate, hexyl methacrylate or higher acrylates having carbon chain length upto C15 carbon atom or combination thereof.

In yet another embodiment of the invention the acrylate and/or acetate content is preferably in the range of 2 to 30% of carboxylic acid content in the dispersion.

In yet another embodiment of the invention optionally known anti-static agent is added in the composition. The anti-static agent is to be added singly by itself or in combination with other antistatic agents, in the weight percent of 0.01-50 wt % of the coating solution. The common antistatic agents used are long chain aliphatic amines, amides, quaternary ammonical salts, esters of phosphoric acid, polyethylene glycol esters or polyols, indium tin oxides, conductive polymers like PEDOT:PSS and nanofibers like polyaniline nanofibers.

Another aspect of the invention a polyester film coated by coating composition comprising a combination of polyethylene carboxylic acid dispersion and homopolymer or copolymer of polyacrylate dispersion and/or homopolymer or copolymer of polyvinyl acetate dispersion, wherein acrylate and/or acetate content be is in the range of 1 to 50% of carboxylic acid content in the dispersion.

In another embodiment of the invention, the coating can be applied has solid content below 20 wt % most preferably below 10 wt %.

In another embodiment of the invention the viscosity of the coating sision be below 40 sec and above 5 sec measured by ford cup.

In another embodiment of the invention the polyester film is capable of printing on all types of (electrostatic) printers with liquid and dry toners.

In another embodiment of the invention the polyester film is either uniaxially oriented or biaxially oriented.

In another embodiment of the invention the polyester film is single or multilayer, extruded or coextruded film.

In another embodiment of the invention the polyester film is transparent, translucent, white, opaque, matte, glossy, hazy, milky white or metallized polyester film.

In another embodiment of the invention the coating is carried out inline or offline on the polyester film.

In another embodiment of the invention, the coating can be applied by inline or offline method.

In inline coating process the composition is applied such that it orients as the film orients without producing any cracks in the coating and can withstand the orientation or heat set conditions which are necessary to produce oriented films.

In offline coating process the coating is applied after film production in separate set of machine. Inline or offline coating can be applied either in one side or both sides of the polyester film.

In another embodiment of the invention the polyester film is having ash pick up in static charge testing is not more than 15% of the film surface area.

In another embodiment of the invention the coated polyester film is handled in both sheet form and roll form.

In another embodiment of the invention the polyester film is coated either one side or both side and coated film is used for electrostatic printing.

A process of making polyester film comprising the steps of:
  a) allowing dicarboxylic acid and alkylene glycol to react along with additives to obtain molten polyester, having Tg between 55° C. to 80° C.

b) molten polyester is either directly extruded through the die or converted to chips. These chips either singly or in combination with other additive chips are extruded to form molten polyester which is sent through the die.

c) molten polyester through a die is quenched on chilled rollers in order to obtain polyester film, d) the polyester film obtained in step (c) is subjected to orienting and heating simultaneously such that the said film in biaxial oriented.

Polyester film thus obtained is in the form of substantially amorphous single layer or multilayer prefilm; this film is then reheated and oriented in sequential biaxial orientation or a simultaneous biaxial orientation. Stretch ratio is in the range of 1.5 to 4.5, determined by a rotation speed ratio of a heated slow-driving roll (upstream) and heated quick-driving roll (downstream). With respect to stretching in a transverse direction (TD), stretching conditions require a stretch ratio of about 3.0 to 5.0 using a tenter wherein both ends of the film are fixed with clips. The temperature maintained during stretching conditions is as below.

$-60°$ C.$\leq \Delta T_{MC} - T_{SMD} \leq 100°$ C. and $-80°$ C.$\leq \Delta T_{MC} - T_{STD} \leq 90°$ C. and $-25°$ C.$\leq T_{STD} - \Delta T_{CG} \leq 80°$ C. and $-35°$ C.$\leq T_{SMD} - \Delta T_{CG} \leq 60°$ C. and $65°$ C.$\leq T_P - \Delta T_{CG} \leq 210°$ C. and $0°$ C.$\leq \Delta T_P - T_{MC} \leq 210°$ C.

Where, $\Delta T_{MC}$=Difference between melting temperature and crystallization temperature $\Delta T_{CG}$=Difference between crystallization temperature and glass transition temperature $T_{SMD}$=Stretching temperature in machine direction $T_{STD}$=Stretching temperature in transverse direction $T_P$=Heat set temperature The extrusion of polyester is carried out at a temperature in the range of 250° C. to 300° C. Further, in step (c) the quenching is carried out on chilled roll at a temperature in the range of 30° C. to 50° C. below Tg of the polyester film.

In yet another embodiment of the invention the polyester film optionally contains suitable additives such as but not limited to antiblocking agents, antioxidants, stabilizers and other additives; which may be contained individually or as combination.

Dicarboxylic acid and alkylene glycol for making polyester film are mixed in the ratio of 1:0.3 to 1:0.5 along with the additives like are antiblocking agents, antioxidants, stabilizers and other suitable compounds that are required for the film production. Dicarboxylic acid is selected from but not limited to terephthalic acid or dimethyl terephthalate either used singly or combination with two or more components which may be 2,6 naphthalene diacrboxylic acid, isophthalic acid, and phthalic acid, aliphatic dicarboxylic acid like adipic acid or ester of same.

Alkylene glycol is selected from but not limited to ethylene glycol either used singly or in combination with two or more component which comprises of diethylene glycol, propylene glycol, butanediol, hexanediol, neopentyl glycol, trans-1,4 cyclohexanediol and cis-1,4-cyclohexanediol Furthermore, the polyester film of the present invention is heat-set for about 1.0-20 seconds in a rear room of a tenter at temperature above 180° C.

In yet another aspect of the present invention the polyester film is transparent, white, opaque, matte, glossy, hazy, milky white, translucent, metalized, etc. These films other than metalized film are obtained by usual method by adding suitable compounds like silica, titanium dioxide, barium sulphate, calcium carbonate, aluminum oxide, cosslinked polystyrene, cosslinked PMMA, zeolites and other silicates. The quantities generally used for these compounds are in the range of 0.01 to 30 wt % of any of these components either singly or in combinations as desired. The transparent films have light transmission value as high as 95% on other hand opaque film have opacity as high as 99.9%. The metalized film is be obtained by metalizing the transparent or opaque film in metalizer by conventional known process.

In yet another embodiment of the invention the thickness of oriented film of the invention is in the range of 1 to 500 micron, more preferably 6 to 450 micron, most preferably 8 to 400 micron.

In yet another embodiment of the invention the base film is either a single layer or multi-layer. The film structure may be A or ABC type A mentions the single layer film; and type ABC mentions multilayer film, where B is the base layer and A and C are outer layer, where A and C can be same or different from each other; or A and/or C can be same as that of B or different from B. The thickness of outer layer can be in range of 0.01% to 30% preferably of 0.05% to 20% thickness.

In another aspect of the present invention the film is coated with aqueous dispersion of poly ethylene copolymer, where ethylene copolymer dispersions can be used singly as ethylene copolymer dispersion or as a mixture of different ethylene copolymer dispersions or a mixture of ethylene copolymer dispersions with poly vinyl acetate dispersion and/or Poly acrylate dispersions. Polyvinyl acetate dispersion and/or polyacrylate dispersions, either homopolymer or copolymer to keep viable electro-polarity for easy processing and printing of the substrate.

In another embodiment of the present invention the ethylene copolymer dispersions used are polyethylene carboxylic acid with polyacrylates and/or vinyl acetates homopolymers or copolymers. The addition of homopolymer or copolymer of polyacrylates and/or vinyl acetates to poly ethylene carboxylic acid dispersions allows both liquid and dry toner to adhere to the coated polyester film and yet control the surface friction which is owned due to its electrostatic attraction between the surface for good processability and runnability of the polyester film. The weight percentage of combination of poly acrylate and/or poly vinyl acetates homopololymer or copolymer where the acetates and/or acrylates groups be used upto 50% most preferably upto 40 wt % of acrylic acid content in the mixture.

In another embodiment of the present invention the ethylene copolymers dispersions that can be used are ethylene carboxylic copolymers where carboxylic are selected from acrylic acid, methacrylic acid, ethacrylic acid, propyl acrylic acid, butyl acrylic acid, hexyl acrylic acid, octyl acrylic acid and other higher acids upto C12 carbon atom; The vinyl acetate dispersions can be homopolymer or copolymer of Polyvinyl acetates or higher acetates groups where higher acetates groups be butyrate, propyrates, hexylrates or higher upto C15 carbon atom like VEOVA, other copolymers like Vinyl acrylate—Ethylene copolymer Vinyl acrylate—VEOVA copolymer, Vinyl acetate acrylic copolymer, Vinyl acetate—Vinyl Chloride copolymers, Vinyl acetate—Acrylamide copolymers, Vinyl Acetate—Butyl Acetate, copolymers, vinyl acetate dibutyl maleinate copolymer, Vinyl Acetate—2 Ethyl Hexyl Acrylate copolymer etc can also be used. Acrylate polymers used be homopolymers of polymethylacrylates, polyethylacrylates, polymethmethacrylates, polyethylethacrylates etc or higher acrylates upto C15 carbon atom, or copolymers of ethylene acrylates, —where acrylates are selected from the group consisting of methyl acrylate, methyl methacrylate, ethyl acrylate, ethyl methacrylate, n-butyl acrylate, butyl methacyrlate, hexyl acrylate, hexyl methacrylate and higher acrylates or its copololymers with ethylene. Ethylene copolymers that are preferred are Ethylene acrylic acid copolymer and vinyl acetate and/or acrylate hompolymers or copolymers. Ethylene acrylic copolymer has been used for printing with Digital printers operating on liquid based toners but when Ethylene Acrylic Acid copolymer is used in combination with vinyl acetate ethylene copolymer and/or polyvinyl acetate imparts good printing property with liquid based toners as well as dry toners. Ethylene Acrylic acid dispersions used are stabilized by alkali or alkaline metal salts or ammonia.

In another embodiment of the present invention a combination of polyethylene acrylic acid dispersion with polyvinylacetate homopolymer or copolymer dispersions and/or polyacrylate homo polymer or copolymers such that the weight percentage of ethylene acrylic acid polymer varies from 1% to 99% more preferably from 10% to 90% and weight percentage of poly vinyl acetate homopolymer or copolymer dispersions and/or acrylate homo polymer or copolymers varies preferably from 1% to 50% and most preferably from 2% to 30% of acrylic acid content in the polymer mixture.

In another embodiment of the present invention the polythylene acrylic acid used has acrylic acid content in range of 10 to 30 wt % most preferably in range of 12 to 25 wt %.

The ethylene vinyl acetate dispersion used is having Tg of −30 to 20 deg C., most preferably Tg of 5-15 deg C. VAE dispersion used are having Tg of 6 to −20 deg C.

In another embodiment of the present invention the coating composition as applied has solid content below 20 wt % and the viscosity of the coating solution is below 40 sec and above 5 sec measured by ford cup. The coating composition is such that it can be applied by inline or offline coating method. The coating can be applied single side or both side of polyester film surface.

It is to be noted that the film of the present invention with the aforesaid characteristics exhibits electrostatic printing property which can be employed by both liquid and dry toner based digital printing systems and is totally different than that of usual coated polyester films.

Characterization of Coated Polyester Film
Coefficient of Friction
Coefficient of Friction is checked by llyod (UK) having model No FT/230.
Fine Ash Pick Up
Static charge is checked by Cigarette ash pickup method. Higher the surface static change, higher will be dust pickup. Fresh cigarette is put in a petridish. Film is put just above the petridish. The ash picks up and covers the film surface. The ash pickup is checked by pantograph method. Higher the surface area covered, higher the electro polarity of the film.
Printability
Printability of the coated polyester film is checked on both liquid toner based digital printer (HP Indigo) and Dry toner based digital printers (Xerox iGen3 and Konica Minolta C70hc). Tape test with 3m Scotch tape is used for checking the adhesion of print over the film surface.

Run Ability:
Runability of the coated polyester film is checked on both liquid toner based digital printer (HP Indigo) and Dry toner based digital printers (Xerox iGen3 and Konica. Minolta C70hc)
Bonding with EVA Film
The printed film is bonded with EVA film to protect the print over the substrate.

EXAMPLES

The following examples are given to illustrate the present invention and should not be construed to limit the scope of the present invention.
Preparation of Ethylene Acrylic Acid Dispersion
In a 1000 ml reactor equipped with stirrer, thermocouple, pressure gauge and release value, 30 gms of ethylene acrylic acid copolymer having acrylic acid component of 20 wt % as available from PRIMACOR 5980I is mixed with 165 gms of deionized water 4.5 gms of DMEA. The reactor is then closed and temperature of 120° C. (max 130° C.) is maintained for 3 hours with agitation. The dispersion formed is clear to milky white in appearance and termed as EAA-1. Dispersion of ESCOR 5200 is also prepared in the similar manner and termed as EAA-2.

The following terms have the corresponding abbreviations, as used in the following Examples and Tables: vinyl acetate-ethylene copolymer (VAE), polyvinyl acetate (PVac), vinyl acetate-ethylene-vinylchloride terpolymer (VAEVC), Noverite™ AD 810G acrylic terpolymer (AD), and acrylic acid-vinyl acetate-ethyl acrylate terpolymer (AAVAEA).

Example 1

Coating composition prepared by combining EAA-1 along with VAE-1, such that VAE-1 is kept at 25 wt % of ethylene acrylic acid.

Example 2

Coating composition prepared by combining EAA-1 along with VAE-1, such that VAE-1 is kept at 15 wt % of ethylene acrylic acid.

Example-3

Coating composition prepared by combining EAA-1 along with VAE-1, such that VAE-1 is kept at 10 wt % of ethylene acrylic acid.

Example-4

Coating composition prepared by combining EAA-1 along with VAE-2, such that VAE-2 is kept at 25 wt % of ethylene acrylic acid.

Example-5

Coating composition prepared by combining EAA-1 along with VAE-2, such that VAE-2 is kept at 15 wt % of ethylene acrylic acid.

Example-6

Coating composition prepared by combining EAA-1 along with VAE such that VAE-2 is kept at 5 wt % of ethylene acrylic acid.

Example 7

Coating composition prepared by combining EAA-2 along with VAE-1, such that VAE-1 is kept at 25 wt % of ethylene acrylic acid.

Example 8

Coating composition prepared by combining EAA-2 along with VAE-1, such that VAE-1 is kept at 15 wt % of ethylene acrylic acid.

Example-9

Coating composition prepared by combining EAA-2 along with VAE-1, such that VAE-1 is kept at 5 wt % of ethylene acrylic acid.

Example-10

Coating composition prepared by combining EAA-2 along with VAE-2, such that VAE-2 is kept at 25 wt % of ethylene acrylic acid.

Example-11

Coating composition prepared by combining EAA-2 along with VAE-2, such that VAE-2 is kept at 15 wt % of ethylene acrylic acid.

Example 42

Coating composition prepared by combining EAA-2 along with VAE-2, such that VAE-2 is kept at 5 wt % of ethylene acrylic acid.

Example 13

Coating composition prepared by combining EAA-1 along with PYAc-1, such that PVAc-1 is kept at 20 wt % of ethylene acrylic acid.

Example 14

Coating composition prepared by combining EAA-1 along with PVAc-1, such that PVAc-1 is kept at 10 wt % of ethylene acrylic acid.

Example-15

Coating composition prepared by combining EAA-1 along with PVAc-1, such that PVAc-1 is kept at 5 wt % of ethylene acrylic acid.

Example-16

Coating composition prepared by combining EAA-2 along with PVAc-1, such that PVAc-1 is kept at 20 wt % of ethylene acrylic acid.

Example-17

Coating composition prepared by combining EAA-2 along with PVAc-1, such that PVAc-1 is kept at 10 wt/o of ethylene acrylic acid.

Example-18

Coating composition prepared by combining EAA-2 along with PVAc-1, such that PVAc-1 is kept at 5 wt % of ethylene acrylic acid.

Example 19

Coating composition prepared by combining EAA-1 along with VAEVC-1, such that VAEVC-1 is kept at 30 wt % of ethylene acrylic acid.

Example 20

Coating composition prepared by combining EAA-1 along with VAEVC-1, such that VAEVC-1 is kept at 20 wt % of ethylene acrylic acid.

Example-21

Coating composition prepared by combining EAA-1 along with VAEVC-1, such that VAEVC-1 is kept at 10 wt % of ethylene acrylic acid.

Example-22

Coating composition prepared by combining EAA-2 along with VAEVC-1, such that VAEVC-1 is kept at 30 wt % of ethylene acrylic acid.

Example-23

Coating composition prepared by combining EAA-2 along with VAEVC-1, such that is kept at 20 wt % of ethylene acrylic acid.

Example-24

Coating composition prepared by combining EAA2 along with VAEVC-1, such that VAEVC-1 is kept at 10 wt % of ethylene acrylic acid.

Example 25

Coating composition prepared by combining EAA-1 along with NOVERITE™ AD 810G acrylic terpolymer (AD), such that AD is kept at 30 wt % of ethylene acrylic acid.

Example 26

Coating composition prepared by combining EAA-1 along with AD, such that AD is kept at 20 wt % of ethylene acrylic acid.

Example-27

Coating composition prepared by combining EAA-1 along with AD, such that AD is kept at 10 wt % of ethylene acrylic acid.

Example-28

Coating composition prepared by combining EAA-2 along with AD, such that AD is kept at 30 wt % of ethylene acrylic acid.

Example-29

Coating composition prepared by combining EAA-2 along with AD, such that AD is kept at 10 wt % of ethylene acrylic acid.

Example-30

Coating composition prepared by combining EAA-2 along with AD, such that AD is kept at 10 wt % of ethylene acrylic acid.

Example 31

Coating composition prepared by combining EAA-1 along with AAVAEA-1, such that AAVAEA-1 is kept at 40 wt % of ethylene acrylic acid.

Example 32

Coating composition prepared by combining EAA-1 along with AAVAEA-1, such that AAVAEA-1 is kept at 30 wt % of ethylene acrylic acid.

Example-33

Coating composition prepared by combining EAA-2 along with AAVAEA-1, such that AAVAEA-1 is kept at 40 wt % of ethylene acrylic acid.

Example-34

Coating composition prepared by combining EAA-2 along with AAVABA-1, such that AAVAEA-1 is kept at 30 wt % of ethylene acrylic acid.

Example-35

Coating composition prepared by combining EAA-1 along with VAE-1, such that VAE-1 is kept at 5 wt % of ethylene acrylic acid and antistatic is kept 1.0 wt % of total composition.

Example-36

Coating composition prepared by combining EAA-1 along with VAE-2, such that VAE-2 is kept at 5 wt % of ethylene acrylic acid and antistatic is kept 1.0 wt % of total composition.

Example-37

Coating composition prepared by combining EAA-2 along with VAE-2 such that VAE-1 is kept at 5 wt % of ethylene acrylic acid and antistatic is kept 1.0 wt % of total composition.

Example-38

Coating composition prepared by combining EAA-2 along with VAE-2, such that VAE-2 is kept at 5 wt % of ethylene acrylic acid and antistatic is kept 1.0 wt % of total composition.

Example-39

Coating composition prepared by combining EAA-1 along with PVAc 1, such that PVAc 1 is kept at 2 wt % of ethylene acrylic acid and antistatic is kept 1.0 wt % of total composition.

Example-40

Coating composition prepared by combining EAA-2 along with PVAc 1, such that PVAc 1 is kept at 2 wt % of ethylene acrylic acid and antistatic is kept 1.0 wt % of total composition.

Example-41

Coating composition prepared by combining EAA-1 along with VAEVC 1, such that VAEVC 1 is kept at 5 wt % of ethylene acrylic acid and antistatic is kept 1.0 wt % of total composition.

Example-42

Coating composition prepared by combining EAA-2 along with VAEVC 1, such that VAEVC 1 is kept at 5 wt % of ethylene acrylic acid and antistatic is kept 1.0 wt % of total composition.

Example-43

Coating composition prepared by combining EAA-1 along with AD, such that AD is kept at 5 wt % of ethylene acrylic acid and antistatic is kept 1.0 wt % of total composition.

Example-44

Coating composition prepared by combining EAA-2 along with AD, such that AD is kept at 5 wt % of ethylene acrylic acid and antistatic is kept 1.0 wt % of total composition.

Example-45

Coating composition prepared by combining EAA-1 along with AAVAEA 1, such that AAVAEA 1 is kept at 8 wt % of ethylene acrylic acid and antistatic is kept 1.0 wt % of total composition.

Example-46

Coating composition prepared by combining EAA-2 along with AAVAEA 1, such that AAVAEA 1 is kept at wt % of ethylene acrylic acid and antistatic is kept 1.0 wt % of total composition.

Comparative Example 1

Coating is prepared by containing only EAA-1 copolymer dispersion.

Comparative Example 2

Costing is prepared by containing only EAA-2 copolymer dispersion.

Comparative Example 0.3

Coating composition prepared by combining EAA-1 along with VAE-1, such that VAE-1 is kept at 60 wt % of ethylene acrylic acid.

Comparative Example 4

Coating composition prepared by combining EAA-1 along with VAE-2, such that VAE-2 is kept at 70 wt % of ethylene acrylic acid.

Comparative Example 5

Coating composition prepared by combining EAA-1 along with PVAc-1, such that PVAc-1 is kept at 55 wt % of ethylene acrylic acid.

Comparative Example 6

Coating composition prepared by combining EAA-1 along with VAEVC, such that VAEVC is kept at 60 wt % of ethylene acrylic acid.

Comparative Example 7

Coating composition prepared by combining EAA-1 along with AD, such that AD is kept at 60 wt % of ethylene acrylic acid.

Comparative Example 8

Coating composition prepared by combining EAA-1 along with AAVAEA, such that AAVAEA is kept at 55 wt % of ethylene acrylic acid.

TABLE 1

| | Coating composition with various components | | | | | | | | |
|---|---|---|---|---|---|---|---|---|---|
| Ex. No. | EAA 1 | EAA 2 | VAE 1 | VAE 2 | PVAc 1 | VAEVC | AD | AAVAEA | Anti static agent |
| 1 | 100 | | 25 | | | | | | |
| 2 | 100 | | 15 | | | | | | |
| 3 | 100 | | 10 | | | | | | |
| 4 | 100 | | | 25 | | | | | |
| 5 | 100 | | | 15 | | | | | |
| 6 | 100 | | | 5 | | | | | |
| 7 | | 100 | 25 | | | | | | |
| 8 | | 100 | 15 | | | | | | |
| 9 | | 100 | 5 | | | | | | |
| 10 | | 100 | | 25 | | | | | |
| 11 | | 100 | | 15 | | | | | |
| 12 | | 100 | | 5 | | | | | |
| 13 | 100 | | | | 20 | | | | |
| 14 | 100 | | | | 10 | | | | |
| 15 | 100 | | | | 5 | | | | |
| 16 | | 100 | | | 20 | | | | |
| 17 | | 100 | | | 10 | | | | |
| 18 | | 100 | | | 5 | | | | |
| 19 | 100 | | | | | 30 | | | |
| 20 | 100 | | | | | 20 | | | |
| 21 | 100 | | | | | 10 | | | |
| 22 | | 100 | | | | 30 | | | |
| 23 | | 100 | | | | 20 | | | |
| 24 | | 100 | | | | 10 | | | |
| 25 | 100 | | | | | | 30 | | |
| 26 | 100 | | | | | | 20 | | |
| 27 | 100 | | | | | | 10 | | |
| 28 | | 100 | | | | | 30 | | |
| 29 | | 100 | | | | | 10 | | |
| 30 | | 100 | | | | | 10 | | |
| 31 | 100 | | | | | | | 40 | |
| 32 | 100 | | | | | | | 30 | |
| 33 | | 100 | | | | | | 40 | |
| 34 | | 100 | | | | | | 30 | |
| 35 | 100 | | 5 | | | | | | 1 |
| 36 | 100 | | | 5 | | | | | 1 |
| 37 | | 100 | 5 | | | | | | 1 |
| 38 | | 100 | 5 | | | | | | 1 |
| 39 | 100 | | | | 2 | | | | 1 |
| 40 | | 100 | | | 2 | | | | 1 |
| 41 | 100 | | | | | 5 | | | 1 |
| 42 | | 100 | | | | 5 | | | 1 |
| 43 | 100 | | | | | | 5 | | 1 |
| 44 | | 100 | | | | | 5 | | 1 |
| 45 | 100 | | | | | | | 8 | 1 |
| 46 | | 100 | | | | | | 8 | 1 |
| CE 1 | 100 | | | | | | | | |
| CE 2 | | 100 | | | | | | | |
| CE 3 | 100 | | 60 | | | | | | |
| CE 4 | 100 | | | 70 | | | | | |
| CE 5 | 100 | | | | 55 | | | | |

TABLE 1-continued

Coating composition with various components

| Ex. No. | EAA 1 | EAA 2 | VAE 1 | VAE 2 | PVAc 1 | VAEVC | AD | AAVAEA | Anti static agent |
|---|---|---|---|---|---|---|---|---|---|
| CE 6 | 100 | | | | | 60 | | | |
| CE 7 | 100 | | | | | | 60 | | |
| CE 8 | 100 | | | | | | | 55 | |

TABLE 2

Test results for coating composition with various components

| Ex No | COF | Static | Fine Ash Pickup | Dry Toner Printability | Wet Toner Printability | Dry Toner Run ability | Wet Toner Run ability | Laminate with EVA film (gm) |
|---|---|---|---|---|---|---|---|---|
| 1 | 0.4 | ok | 0-5 | OK | ok | Ok | Ok | 400-450 |
| 2 | 0.41 | ok | 0-5 | OK | ok | Ok | Ok | 425-460 |
| 3 | 0.41 | ok | 2-8, | OK | ok | Ok | Ok | 370-430 |
| 4 | 0.4 | ok | 0-5 | OK | ok | Ok | Ok | 450-480 |
| 5 | 0.42 | ok | 0-5 | OK | ok | Ok | Ok | 400-450 |
| 6 | 0.42 | ok | 2-8, | OK | ok | Ok | Ok | 380-430 |
| 7 | 0.4 | ok | 4-8. | OK | ok | Ok | Ok | 410-460 |
| 8 | 0.41 | ok | 4-8. | OK | ok | Ok | Ok | 370-450 |
| 9 | 0.41 | ok | 6-15. | OK | ok | Ok | Ok | 370-410 |
| 10 | 0.4 | ok | 0-5 | OK | ok | Ok | Ok | 430-470 |
| 11 | 0.42 | ok | 3-7. | OK | ok | Ok | Ok | 400-450 |
| 12 | 0.42 | ok | 4-9. | OK | ok | Ok | Ok | 400-430 |
| 13 | 0.42 | ok | 0-8. | OK | ok | Ok | Ok | 500-570 |
| 14 | 0.43 | ok | 5-10. | OK | ok | Ok | Ok | 440-500 |
| 15 | 0.43 | ok | 10-15. | OK | ok | Ok | Ok | 410-440 |
| 16 | 0.41 | ok | 0-5 | OK | ok | Ok | Ok | 470-530 |
| 17 | 0.43 | ok | 0-5 | OK | ok | Ok | Ok | 410-460 |
| 18 | 0.43 | ok | 6-9. | OK | ok | Ok | Ok | 360-410 |
| 19 | 0.42 | ok | 5-8. | OK | ok | Ok | Ok | 370-420 |
| 20 | 0.42 | ok | 8-10. | OK | ok | Ok | Ok | 350-400 |
| 21 | 0.42 | ok | 7-14. | OK | ok | Ok | Ok | 320-380 |
| 22 | 0.43 | ok | 2-6. | OK | ok | Ok | Ok | 350-400 |
| 23 | 0.43 | ok | 1-8. | OK | ok | Ok | Ok | 330-370 |
| 24 | o,46 | ok | 8-15. | OK | ok | Ok | Ok | 330-350 |
| 25 | 0.42 | ok | 4-8. | OK | ok | Ok | Ok | 380-440 |
| 26 | 0.43 | ok | 4-9. | OK | ok | Ok | Ok | 350-400 |
| 27 | 0.43 | ok | 5-9. | OK | ok | Ok | Ok | 320-380 |
| 28 | o,46 | ok | 4-8. | OK | ok | Ok | Ok | 350-400 |
| 29 | 0.44 | ok | 4-9. | OK | ok | Ok | Ok | 330-370 |
| 30 | 0.45 | ok | 5-9. | OK | ok | Ok | Ok | 330-350 |
| 31 | 0.45 | ok | 8-15. | OK | ok | Ok | Ok | 420-470 |
| 32 | 0.45 | ok | 12-15. | OK | ok | Ok | Ok | 400-460 |
| 33 | 0.44 | ok | 5-10. | OK | ok | Ok | Ok | 400-450 |
| 34 | 0.45 | ok | 7-16. | OK | ok | Ok | Ok | 350-430 |
| 35 | 0.43 | ok | 0-5 | OK | ok | Ok | Ok | 350-370 |
| 36 | 0.44 | ok | 0-5 | OK | ok | Ok | Ok | 330-370 |
| 37 | 0.46 | ok | 0-5 | OK | ok | Ok | Ok | 350-370 |
| 38 | 0.42 | ok | 0-5 | OK | ok | Ok | Ok | 330-370 |
| 39 | 0.42 | ok | 0-5 | OK | ok | Ok | Ok | 410-490 |
| 40 | 0.45 | ok | 0-5 | OK | ok | Ok | Ok | 370-430 |
| 41 | 0.46 | ok | 0-5 | OK | ok | Ok | Ok | 400-450 |
| 42 | 0.43 | ok | 0-5 | OK | ok | Ok | Ok | 330-380 |
| 43 | 0.41 | ok | 0-5 | OK | ok | Ok | Ok | 400-450 |
| 44 | 0.43 | ok | 0-5 | OK | ok | Ok | Ok | 330-380 |
| 45 | 0.43 | ok | 0-5 | OK | ok | Ok | Ok | 400-450 |
| 46 | 0.42 | ok | 0-5 | OK | ok | Ok | Ok | 340-390 |
| CE 1 | 0.51 | Not OK | 70-80 | Not OK | ok | Not OK | Ok | 200-230 |
| CE 2 | 0.53 | Not OK | 60-70 | Not OK | ok | Not OK | Ok | 200-230 |
| CE 3 | 0.65 | OK | 5-9. | Not OK | Not OK | Not OK | Not OK | 55-100 |
| CE 4 | 0.64 | OK | 5-9. | Not OK | Not OK | Not OK | Not OK | 55-100 |
| CE 5 | Tackiness | | | | | | | |
| CE 6 | Tackiness | | | | | | | |
| CE 7 | 0.45 | OK | 3-7. | Not OK | Not OK | OK | OK | 55-100 |
| CE 8 | Tackiness | | | | | | | |

The invention claimed is:

1. A coating composition for applying on a polyester film to form a coating capable of being printed on by all types of electrostatic printers, wherein the coating composition comprising:

a dispersion mixture comprising:
(i) a polyethylene carboxylic acid polymer dispersion comprising an ethylene acrylic acid copolymer, wherein the ethylene carboxylic acid polymer has an acrylic acid content in the range of 10 to 30 wt %; and (ii) at least one second polymer dispersion selected from a polyacrylate homopolymer or copolymer dispersion and/or a polyvinyl acetate homopolymer or copolymer dispersion;

wherein the ethylene acrylic acid copolymer is in the range of 10 to 90 wt %, based on the total weight of the dispersion mixture;

wherein the polyacrylate polymer content and/or the polyvinyl acetate polymer content is in the range of 2 to 40 wt % of the ethylene acrylic acid copolymer content in the dispersion mixture; and wherein the dispersion mixture represents 100% of the coating composition.

2. The coating composition of claim 1, wherein the polyacrylate polymer content and/or the polyvinyl acetate polymer content is in the range of 5 to 30 wt % of the ethylene acrylic acid content in the dispersion mixture.

3. The coating composition of claim 1, wherein the ethylene acrylic acid copolymer further comprises a carboxylic acid monomer chosen from methacrylic acid, ethyl acrylic acid, propyl acrylic acid, butyl acrylic acid, hexyl acrylic acid, octyl acrylic acid, other higher acids having carbon chain length up to C15, or combination thereof.

4. The coating composition of claim 1, wherein the polyvinyl acetate of the at least one second polymer dispersion is a homopolymer or copolymer of methyl acetate, butyl acetate, or higher acetates having carbon chain length up to C15, or combination thereof.

5. The coating composition of claim 1, wherein the polyacrylate of the at least one second polymer dispersion is a homopolymer or copolymer of methylacrylate, ethylacrylate, methylmethacrylate, ethylmethacrylate, n-butyl acrylate, butyl methacrylate, hexyl acrylate, hexyl methacrylate, or higher acrylates having carbon chain length up to C15 carbon atom, or combination thereof.

6. The coating composition of claim 1, wherein optionally a known anti-static agent is added in the composition.

7. The coating composition of claim 1, wherein the coating composition is coated on a polyester film.

8. The coating composition of claim 7, wherein the coated coating composition on the polyester film is capable of being printed on by electrostatic printers using a liquid toner or a dry toner.

9. The coating composition of claim 8, wherein the polyester film is either uniaxially oriented or biaxially oriented.

10. The coating composition of claim 7, wherein the polyester film is either uniaxially oriented or biaxially oriented.

11. The coating composition of claim 7, wherein the polyester film is a single layer or a multilayer film, and wherein the polyester film is an extruded or coextruded film.

12. The coating composition of claim 7, wherein the polyester film is transparent, translucent, white, opaque, matte, glossy, hazy or milky white or metalized polyester film.

13. The coating composition of claim 7, wherein the coating on the polyester film is carried out inline or offline.

14. The coating composition of claim 7, wherein the polyester film has ash pick up in static charge testing of not more than 15% of the film surface area.

* * * * *